US012775438B2

(12) United States Patent
Zhao et al.

(10) Patent No.: US 12,775,438 B2
(45) Date of Patent: Oct. 27, 2026

(54) METHOD FOR AUDIO SHARING, PRIMARY AUDIO PLAYING DEVICE AND SYSTEM FOR AUDIO SHARING

(71) Applicant: Samsung Electronics Co., Ltd., Suwon-si (KR)

(72) Inventors: Shaoying Zhao, Xi'an (CN); Dong Xu, Xi'an (CN); Xin Pan, Xi'an (CN); Yajun Zhi, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 18/797,764

(22) Filed: Aug. 8, 2024

(65) Prior Publication Data

US 2025/0103271 A1 Mar. 27, 2025

(30) Foreign Application Priority Data

Sep. 26, 2023 (CN) ........................ 202311256515.3

(51) Int. Cl.
*G06F 3/16* (2006.01)
*H04L 43/028* (2022.01)

(52) U.S. Cl.
CPC .............. *G06F 3/16* (2013.01); *H04L 43/028* (2013.01)

(58) Field of Classification Search
CPC ................................. G06F 3/16; H04L 43/028
See application file for complete search history.

(56) References Cited

U.S. PATENT DOCUMENTS

| | | | | |
|---|---|---|---|---|
| 10,990,349 | B2 | 4/2021 | Kumar et al. | |
| 2012/0058727 | A1* | 3/2012 | Cook | H04R 3/12 455/41.3 |
| 2020/0288292 | A1* | 9/2020 | Cheong | H04W 76/15 |
| 2021/0068127 | A1* | 3/2021 | Wang | H04W 76/19 |
| 2022/0053270 | A1 | 2/2022 | Ko et al. | |
| 2022/0174392 | A1* | 6/2022 | Jorgovanovic | H04R 1/1091 |

FOREIGN PATENT DOCUMENTS

| | | | |
|---|---|---|---|
| CN | 103825635 | B | 4/2016 |
| CN | 111447600 | A | 7/2020 |
| CN | 112995829 | A | 6/2021 |
| CN | 113825125 | A | 12/2021 |
| CN | 114760616 | A | 7/2022 |
| WO | 2022-119772 | A1 | 6/2022 |

* cited by examiner

*Primary Examiner* — Joseph Saunders, Jr.
(74) *Attorney, Agent, or Firm* — Fish & Richardson P.C.

(57) ABSTRACT

A method for audio sharing may include: establishing, by a first primary audio playing device of a first set of audio playing devices, a wireless connection with an audio sharing device, broadcasting, by the first primary audio playing device, a snoop enable message, the snoop enable message including information indicating a desired wireless communication channel, receiving, by the first primary audio playing device, a snoop consent event message sent on the desired wireless communication channel from a second primary audio playing device of a second set of audio playing devices, and snooping for and playing at least one audio packet sent on the desired wireless communication channel by an audio sharing device.

15 Claims, 7 Drawing Sheets

METHOD FOR AUDIO SHARING, PRIMARY AUDIO PLAYING DEVICE AND SYSTEM FOR AUDIO SHARING

CROSS-REFERENCE TO RELATED APPLICATION(S)

This U.S. non-provisional application claims the benefit of priority under 35 U.S.C. § 119 to Chinese Patent Application No. 202311256515.3, filed on Sep. 26, 2023, in the China National Intellectual Property Administration, the entire disclosure of which is incorporated herein by reference.

BACKGROUND

Various example embodiments of the inventive concepts relate to an audio playing device, and more specifically, to a method for audio sharing, a primary audio playing device, and/or a system for audio sharing, etc.

Currently, technologies for audio reception and synchronization of audio playing devices, such as a wireless earphone (e.g., a True Wireless Stereo (TWS)), etc., are mainly divided into a classic Bluetooth-based earphone snooping solution and a Low-Energy Audio (LE Audio)-based synchronized rendering solution, where the former approach is more mature and the latter approach is still under development.

As the market application of the wireless earphone becomes more and more extensive, various manufacturers have proposed multi-connection solutions for the wireless earphone, such as, 1) connecting a pair of wireless earphones to two audio sharing devices at the same time, receiving audio data from one of the audio sharing devices and then switching connections to the second audio sharing device to receive a call from the second audio sharing device; and/or 2) an audio sharing device may manage the connection to multiple pairs of wireless earphones and handle services of the multiple pairs of wireless earphones in a time division manner.

However, existing reception and synchronization techniques such as those described above are all based on the multiple-connection solutions in which wireless earphones must be connected one by one (e.g., in a sequential and/or serial manner), and the audio acknowledgements need to be returned by each wireless earphone in a time division manner or in a channel division manner, which have high power consumption rate and/or is slow in providing data acknowledgement, thereby resulting in low audio fluency and a poor user experience, etc.

SUMMARY

According to at least one example embodiment of the inventive concepts, there is provided a method for audio sharing, the method including: establishing, by a first primary audio playing device of a first set of audio playing devices, a wireless connection with an audio sharing device, broadcasting, by the first primary audio playing device, a snoop enable message, the snoop enable message including information indicating a desired wireless communication channel, receiving, by the first primary audio playing device, a snoop consent event message sent on the desired wireless communication channel from a second primary audio playing device of a second set of audio playing devices, and snooping for and playing at least one audio packet sent on the desired wireless communication channel by an audio sharing device.

Additionally, the method may further include: receiving, by the first primary audio playing device, an audio start message from the audio sharing device, the audio start message including information regarding the desired wireless communication channel, before the first primary audio playing device broadcasts the snoop enable message.

Additionally, the broadcasting the snoop enable message may include: periodically broadcasting, by the first primary audio playing device, the snoop enable message.

Additionally, the method may further include: receiving, by the first primary audio playing device, a first acknowledgement message from the second primary audio playing device on the desired wireless communication channel, the first acknowledgement message indicating that the audio packet has been correctly received.

Additionally, the method may further include: sending, by the first primary audio playing device, an audio packet retransmission indication message to the audio sharing device if the first acknowledgement message is not received.

According to at least one example embodiment of the inventive concepts, there is provided a method for audio sharing, the method including: receiving, a second primary audio playing device of a second set of audio playing devices, a snoop enable message broadcast by a first primary audio playing device of a first set of audio playing devices, the first primary audio playing device having a wireless connection with an audio sharing device, the snoop enable message including information regarding a desired wireless communication channel, sending, by the second primary audio playing device, a snoop consent event message to the first primary audio playing device on the desired wireless communication channel, and snooping for, by the second primary audio playing device, and playing at least one audio packet sent by the audio sharing device on the desired wireless communication channel.

Additionally, the method may further include: receiving, by the second primary audio playing device, a second acknowledgement message from a second secondary audio playing device of the second set of audio playing devices on the desired wireless communication channel, the second acknowledgement message indicating that the audio packet has been correctly received by the second secondary audio playing device, and sending, by the second primary audio playing device, a first acknowledgement message to the first primary audio playing device on the desired wireless communication channel, the first acknowledgement message indicating that the audio packet has been correctly received by the second primary audio playing device.

Additionally, the sending the first acknowledgement message to the first primary audio playing device on the desired wireless communication channel may include: sending the first acknowledgement message to the first primary audio playing device on the desired wireless communication channel after a random back off time.

According to at least one example embodiment of the inventive concepts, there is provided a first primary audio playing device of a first set of audio playing devices, the first primary audio playing device including: processing circuitry configured to, establish a wireless connection with an audio sharing device, broadcast a snoop enable message including information regarding a desired wireless communication channel, receive a snoop consent event message sent on the desired wireless communication channel by a second primary audio playing device of a second set of audio playing devices, and snoop for and play at least one audio packet sent on the desired wireless communication channel by the audio sharing device.

Additionally, the processing circuitry may be further configured to: receive an audio start message from the audio sharing device before broadcasting the snoop enable message, the audio start message including information regarding the desired wireless communication channel.

Additionally, the processing circuitry may be further configured to: periodically broadcast the snoop enable message.

Additionally, the processing circuitry may be further configured to: receive a first acknowledgement message from the second primary audio device on the desired wireless communication channel, the first acknowledgement message indicating that the audio packet has been correctly received.

Additionally, the processing circuitry may be further configured to: send an audio packet retransmission indication message to the audio sharing device on the desired wireless communication channel in response to not receiving the first acknowledgement message from the second primary audio playing device.

According to at least one example embodiment of the inventive concepts, there is provided a second primary audio playing device of a second set of audio playing devices, the second primary audio playing device including: processing circuitry configured to, receive a snoop enable message broadcast by a first primary audio playing device of a first set of audio playing devices, the snoop enable message including information regarding a desired wireless communication channel, the first primary audio playing device having a wireless connection with an audio sharing device, send a snoop consent event message to the first primary audio playing device on the desired wireless communication channel, and snoop for and play at least one audio packet sent by the audio sharing device on the desired wireless communication channel.

Additionally, the processing circuitry may be further configured to receive a second acknowledgement message sent on the desired wireless communication channel from a second secondary audio playing device of the second set of audio playing devices, the second acknowledgement message indicating that the audio packet has been correctly received by the second secondary audio playing device.

Additionally, the processing circuitry may be further configured to send the first acknowledgement message to the first primary audio playing device on the desired wireless communication channel after a random back off time.

According to at least one example embodiment of the inventive concepts, there is provided a system for audio sharing including the first primary audio playing device described previously and/or the second primary audio playing device described previously.

According to at least one example embodiment of the inventive concepts, there is provided an electronic device including a memory having computer-executable instructions stored thereon and processing circuitry, which when executed by the processing circuitry, performs one or more of the methods described previously.

According to at least one example embodiment of the inventive concepts, there is provided a non-transitory computer readable medium having computer-executable instructions stored thereon, which when executed by processing circuitry, causes the processing circuitry to perform one or more of the methods described previously.

According to one or more example embodiments of the inventive concepts, the number of connections between the audio sharing device and the audio playing device may be reduced by broadcasting a snoop enable message, thereby reducing the power consumption of the audio playing devices, reducing delays in receiving audio packets from an audio sharing device, and/or increasing the smoothness of audio play back by the audio playing devices; real-time sharing of audio packets may be achieved by using at least one audio playing device to simultaneously snoop for (e.g., listen for) the audio packets sent by the audio sharing device; and/or audio packet collision may be avoided and/or the timeliness of audio packet delivery may be increased at the same time by sending acknowledgement messages to a first primary audio playing device using a desired and/or predetermined wireless communication channel after a random back off time, etc.

BRIEF DESCRIPTION OF THE DRAWINGS

The above and other purposes and features of various example embodiments of the inventive concepts will become more clear through the following descriptions made in conjunction with the figures schematically illustrating one or more the example embodiments, in which.

DETAILED DESCRIPTION

Figure 1:
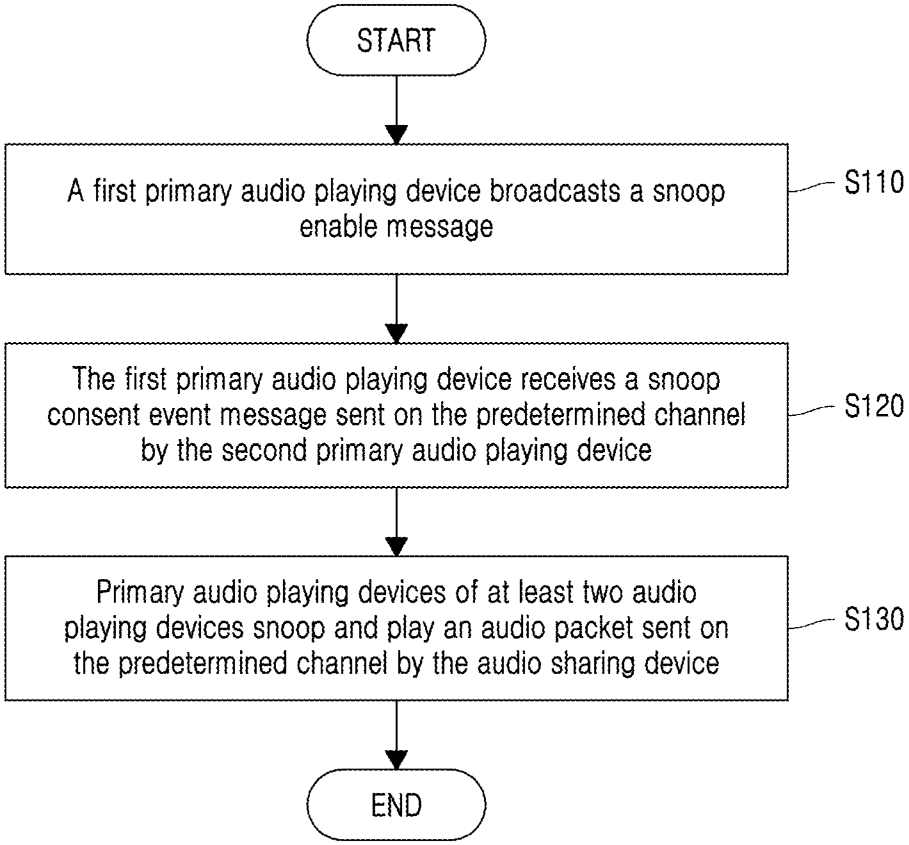
FIG. 1 is a flowchart illustrating a method for audio sharing according to at least one example embodiment of the inventive concepts.

Hereinafter, various example embodiments of the inventive concepts are described with reference to the accompanying drawings, in which like reference numerals are used to depict the same or similar elements, features, and structures. However, the inventive concepts is not intended to be limited by the example embodiments described herein and it is intended that the example embodiments of the inventive concepts cover all modifications, equivalents, and/or alternatives of the example embodiments disclosed herein, provided they come within the scope of the appended claims and their equivalents. The terms and words used in the following description and claims are not limited to their dictionary meanings, but, are merely used to enable a clear and consistent understanding of the example embodiments of the inventive concepts. Accordingly, it should be apparent to a person of ordinary skill in the art that the following description of various example embodiments of the inventive concepts is provided for illustration purpose only and not for the purpose of limiting the example embodiments of the inventive concepts as defined by the appended claims and their equivalents.

It is to be understood that the singular forms include plural forms, unless the context clearly dictates otherwise. The terms "include," "include," and "have", used herein, indicate disclosed functions, operations, or the existence of elements, but does not exclude other functions, operations, or elements.

For example, the expressions "A or B," or "at least one of A and/or B" may indicate A and B, A, or B. For instance, the expression "A or B" or "at least one of A and/or B" may indicate (1) A, (2) B, or (3) both A and B.

In various example embodiments of the inventive concepts, it is intended that when a component (for example, a first component) is referred to as being "coupled" or "connected" with/to another component (for example, a second component), the component may be directly connected to the other component or may be connected through another component (for example, a third component). In contrast, when a component (for example, a first component) is referred to as being "directly coupled" or "directly connected" with/to another component (for example, a second component), another component (for example, a third component) does not exist between the component and the other component.

The expression "configured to", used in describing one or more example embodiments of the inventive concepts, may be used interchangeably with expressions such as "suitable for," "having the capacity to," "designed to," "adapted to," "made to," and "capable of", for example, according to the situation. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or an application processor (AP)) for performing corresponding operations by executing at least one software program stored in a memory device.

The terms used herein are to describe certain example embodiments of the inventive concepts, but are not intended to limit the scope of other example embodiments. Unless otherwise indicated herein, all terms used herein, including technical or scientific terms, may have the same meanings that are generally understood by a person of ordinary skill in the art. In general, terms defined in a dictionary should be considered to have the same meanings as the contextual meanings in the related art, and, unless clearly defined herein, should not be understood differently or as having an excessively formal meaning. In any case, even terms defined in the example embodiments of the inventive concepts are not intended to be interpreted as excluding other example embodiments of the inventive concepts.

FIG. 1 is a flowchart illustrating a method for audio sharing according to at least one example embodiment of the inventive concepts. According to at least one example embodiment, audio may be shared by at least one audio sharing device to at least two sets of audio playing devices (e.g., a first set of audio playing device and a second set of audio playing device), the at least two sets of audio playing devices each including a primary audio playing device (e.g., a primary ear bud, a primary hearing aid, a primary speaker, a primary smart device, etc.) and a secondary audio playing device (e.g., a secondary ear bud, a secondary hearing aid, a secondary speaker, a secondary smart device, etc.), and the primary audio playing device and the secondary audio playing device of each set of audio playing devices may establish a short-range wireless connection with each other, with the other set(s) of audio playing device(s), and/or with the audio sharing device, but the example embodiments are not limited thereto, and for example, one or more of the sets of audio playing devices may include more than two audio playing devices, may include a single audio playing device, there may be a plurality of audio sharing devices, etc.

Referring to FIG. 1, at operation S110, the first primary audio playing device broadcasts and/or transmits a snoop enable message including information for a desired and/or predetermined channel (e.g., wireless communication channel, wireless channel, etc.). According to at least one example embodiment, the first primary audio playing device may establish a wireless communication connection, e.g., a short-range wireless connection, etc., with the audio sharing device, wherein the second primary audio playing device may be a primary audio playing device other than the first primary audio playing device, etc., but the example embodiments are not limited thereto. Additionally, the wireless connection may be a short-range wireless connection such as a Bluetooth connection, etc., a comparatively longer-range wireless connection such as a WiFi connection, etc., but is not limited thereto.

According to at least one example embodiment, a format for data frame of the snoop enable message may be as shown in Table 1 below, but is not limited thereto.

TABLE 1

| Payload | | | | | | |
|---|---|---|---|---|---|---|
| Broadcast data | | | | | | |
| Address of a first primary audio playing device (6 octetes) | Handle connected to an audio sharing device (2 octetes) | Information for a desired channel (2 octetes) | Audio configuration information (6 octets) | Central Clock (2 octetes) | Encryption status (1 octete) | Link key (16 octetes) |

As shown in Table 1, the snoop enable message may include at least one of an address of the first primary audio playing device (e.g., network address, etc.), a handle connected to the audio sharing device, information for a desired and/or predetermined channel (e.g., wireless communication channel, etc.), audio configuration information, a central clock, encryption status information, and/or a link key, etc., but the example embodiments are not limited thereto. It should be noted that, except for the address of the first primary audio playing device, a person of ordinary skill in the art may configure the snoop enable message as desired and/or needed, such as omitting the audio configuration information where the audio configuration information has been previously configured in the audio sharing device and the audio playing devices, omitting the encryption status where encryption is not performed, adding additional types of information, etc.

Before the first primary audio playing device broadcasts and/or transmits the snoop enable message to the second primary audio playing device, the first primary audio playing device may receive an audio start message including information for the desired and/or predetermined channel sent by the audio sharing device, but is not limited thereto. In addition, the first primary audio playing device may periodically broadcast and/or transmit the snoop enable message and/or broadcast and/or transmit the snoop enable message on demand (e.g., in response to a user request, etc.) to the second primary audio playing device, etc., but is not limited thereto.

At operation S120, the first primary audio playing device receives a snoop consent event message sent (e.g., transmitted, etc.) on the desired and/or predetermined channel by the second primary audio playing device. The snoop consent event message may be used to indicate consent given by the second primary audio playing device and/or the user of the second primary audio playing device to the first primary audio playing device to snoop (e.g., listen, etc.). Subsequently, by way of example only and wherein the example embodiments are not limited thereto, the first primary audio playing device may, in response to receiving the snoop consent event message, send and/or transmit an audio start consent message to the audio sharing device to send and/or transmit audio data, etc. It should be noted that the above first primary audio playing device sending the audio start consent message to the audio sharing device is only an example and is not a limitation, and may be modified and changed by a person of ordinary skill in the art to suit practical needs, such as, if all of the audio playing devices start sharing audio together, the first primary audio playing device may send an audio start consent message to the audio sharing device after operation S120, etc., and/or if the other audio playing devices are joined later, the first primary audio playing device may directly send an audio start consent message to the audio sharing device after the audio sharing device establishes a link with the first primary audio playing device, and does not need to send an audio start consent message after operation S120, etc.

Furthermore, according to at least one example embodiment, secondary audio playing devices (e.g., the first secondary audio playing device and the second secondary audio playing device, etc.) corresponding to the primary audio playing devices (e.g., the first primary audio playing device and the second primary audio playing device, etc.), respectively, may also receive the snoop enable message transmitted and/or broadcast by the first primary audio playing device in operation S110, and the secondary audio playing devices which receive the snoop enable message may send (e.g., transmit and/or broadcast, etc.) the snoop consent event message to their respective primary audio playing devices and enter a snoop mode, etc. The second primary audio playing device which received the snoop enable message then sends (e.g., transmits, broadcasts, etc.) a snoop consent event message to the first primary audio playing device, e.g., a second primary audio playing device sends a snoop consent event message to the first primary audio playing device in a case where the second primary audio playing device and a corresponding secondary audio playing device (e.g., the second secondary audio playing device, etc.) both receive the snoop enable message, but the example embodiments are not limited thereto.

According to at least one example embodiment, a format for a data frame of the snoop consent event message may be as shown in Table 2 below.

TABLE 2

| Payload | | |
|---|---|---|
| Direct broadcast header | | Snoop preparation status |
| Address of the first primary audio playing device (6 octetes) | Extension bit | Success or fail (1 octetes) |

As shown in Table 2, by way of example only and the example embodiments not limited thereto, the snoop consent event message may include an address (e.g., network address, wireless communication address, etc.) of the first primary audio playing device, at least one extension bit, and/or a snoop preparation status, etc., wherein a person of ordinary skill in the art may configure whether to set the extension bit and/or configure the number of octets of the extension bit as desired.

In addition, the first primary audio playing device may perform the corresponding operations in operations S110 and S120 above (e.g., broadcast the snoop enable message and receive the snoop consent event message) within a desired and/or predetermined period of time, and as an example only and not limited thereto, the desired and/or predetermined period of time may be set to, e.g., 3 to 8 seconds, etc.

At operation S130, primary audio playing devices of at least two audio playing devices snoop (e.g., listen, etc.) and play at least one audio packet sent on the desired and/or predetermined channel by the audio sharing device. In this operation, audio playing devices use a snoop (e.g., listening) manner to obtain audio data, so that interference and/or transmission time differences for air interfaces (e.g., radio interfaces, wireless communication interfaces, etc.) may be reduced and/or excluded and/or all audio playing devices may receive the audio data at the same time, etc.

By way of example only and the example embodiments not being limited thereto, after each time the audio sharing device sends (e.g., transmits and/or broadcasts) an audio packet, the first primary audio playing device may further receive a first acknowledgement message indicating that the audio packet has been correctly received sent on the desired and/or predetermined channel by the second primary audio playing device, etc. If the first acknowledgement message sent by the second primary audio playing device on the desired and/or predetermined channel is not received, the first primary audio playing device may send (e.g., transmits and/or broadcasts) an audio packet retransmission indication message to the audio sharing device, etc.

Figure 2:
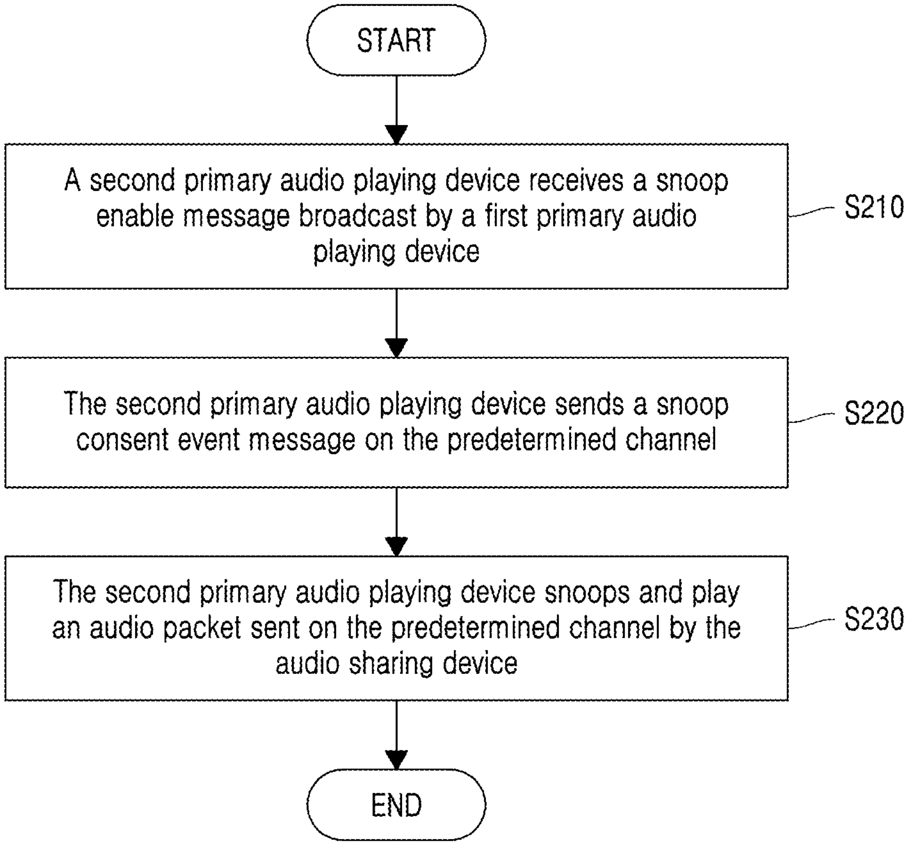
FIG. 2 is a flowchart illustrating a method for audio sharing according to at least one example embodiment of the inventive concepts.

FIG. 2 is a flowchart illustrating a method for audio sharing according to at least one example embodiment of the inventive concepts. According to at least one example embodiment, audio may be shared by an audio sharing device to at least two sets of audio playing devices, wherein each set of audio playing devices include at least a primary audio playing device and a secondary audio playing device, and the primary audio playing device and the secondary audio playing device of the each audio playing device may establish a wireless connection (e.g., short-range wireless connection, etc.), but the example embodiments are not limited thereto. For example, there may be three or more sets of audio playing devices, one or more of the sets of audio playing devices may include three or more audio playing devices, and/or there may be two or more audio sharing devices, etc.

Referring to FIG. 2, at operation S210, a second primary audio playing device of a second set of audio play devices receives a snoop enable message including information for a desired and/or predetermined channel broadcast (and/or transmitted, sent, etc.) by a first primary audio playing device of a first set of audio play devices, but the example embodiments are not limited thereto. According to at least one example embodiment, the first primary audio playing device may establish a wireless connection, e.g., a short-range wireless connection, etc., with the audio sharing device, wherein the second primary audio playing device may be a primary audio playing device other than the first primary audio playing device among primary audio playing devices of the at least two audio playing devices, but is not limited thereto.

At operation S220, the second primary audio playing device sends (e.g., transmits, broadcasts, etc.) a snoop consent event message on the desired and/or predetermined channel.

At operation S230, the second primary audio playing device snoops (e.g., listens for) and plays at least one audio packet sent on the desired and/or predetermined channel by the audio sharing device. Subsequently, the second primary audio playing device may receive a second acknowledgment message indicating that a corresponding second secondary device of the second set of audio play devices has correctly received the audio packet sent on the desired and/or predetermined channel by the second secondary audio device. Furthermore, the second primary audio playing device may send a first acknowledgment message indicating that the audio packet has been correctly received to the first primary audio playing device on the desired and/or predetermined channel. According to at least one example embodiment, the second primary audio playing device may send the first acknowledgment message to the first primary audio playing device on the desired and/or predetermined channel after a respective random fallback time to avoid packet collision, etc., but the example embodiments are not limited thereto, and for example, the second primary audio playing device may transmit the first acknowledgement message after a desired time interval configured by the audio sharing device and/or the first primary audio playing device, etc.

More specifically, the second primary audio playing device of the second set of audio playing devices may send (e.g., transmit, broadcast, etc.) the first acknowledgment message indicating whether an audio packet was correctly received to the first primary audio playing device of the first set of audio playing devices via the desired and/or predetermined channel using the address of the first primary audio playing device, and in response to first acknowledgment messages each indicating that the audio packet have been correctly received and the first primary audio playing device also correctly receiving the audio packet, the first primary audio playing device may send an acknowledgment message indicating that the audio data has been correctly received to the audio sharing device, and then the audio sharing device may continue to send the next audio packet and/or end the process. According to at least one example embodiment, the first primary audio playing device may send the acknowledgement message to the audio sharing device through the desired and/or predetermined channel, but the example embodiments are not limited thereto. Furthermore, in response to a first acknowledgement message indicating that the audio packet was not received correctly and/or the first primary audio playing device does not correctly receiving the audio data, the first primary audio playing device may send an acknowledgement (e.g., negative acknowledgement, NACK, etc.) message indicating that the audio data was not received correctly to the audio sharing device to cause the audio sharing device to resend the audio packet, etc.

Furthermore, a second secondary audio playing device may send a second acknowledgment message to a corresponding second primary audio playing device (e.g., a first secondary audio playing device that has received the audio data packet may also send a second acknowledgment message to the first primary audio playing device), and then the second primary audio playing device sends the first acknowledgment message to the first primary audio playing device, but the example embodiments are not limited thereto. More specifically, the second secondary audio playing device of the second set of audio playing devices that has received the audio packet may send a second acknowledgment message indicating the audio packet has been correctly received to the second primary audio playing device of the second set of audio playing devices, and the second primary audio playing device may, based on the second acknowledgment message sent by corresponding second secondary audio playing device and whether the second primary audio playing device itself has correctly received the audio packet, send the first acknowledgment message indicating the audio packet has been correctly received to the first primary audio playing device via the desired and/or predetermined channel and the address of the first primary audio playing device, but the example embodiments are not limited thereto. According to at least one example embodiment, the second primary audio playing device may send a first acknowledgement message indicating that the audio packet has been correctly received in a case that the second primary audio playing device has received the second acknowledgement message sent by the corresponding second secondary audio playing device and the second primary audio playing device itself has correctly received the audio packet, and may send a first acknowledgement message indicating the audio packet was not correctly received in a case that the second primary audio playing device did not receive the second acknowledgement message sent by corresponding second secondary audio playing device and/or the second primary audio playing device itself did not correctly receive the audio packet, etc., but the example embodiments are not limited thereto.

In one or more of the above example embodiments, the secondary audio playing device may send the second acknowledgment message to a corresponding primary audio playing device as soon as it has received the audio packet without needing to confirm whether the audio packet has been correctly received, the secondary audio playing device may also send the second acknowledgment message to a corresponding primary audio playing device in a case of confirming that the audio packet has been received correctly, but the example embodiments are not limited thereto. In addition, the second primary audio playing device may send the first acknowledgment message to the first primary audio playing device in a case where the second primary audio playing device itself has received the audio packet (and has also received the second acknowledgment message from corresponding second secondary audio playing device) without needing to confirm whether the audio packet has been received correctly, the second primary audio playing device may also send the first acknowledgment message to the first primary audio playing device in a case of confirming that the second primary audio playing device itself has received the audio packet correctly (and has also received the second acknowledgment message from corresponding second secondary playing device), but the example embodiments are not limited thereto. In addition, the first primary audio playing device may send an acknowledgement message to the audio sharing device without confirming whether the audio packet has been correctly received, as long as the first primary audio playing device itself has received the audio packet (and has also received the second acknowledgement message from the first secondary audio playing device and received the first acknowledgement message from the second primary audio playing device), may also send an acknowledgement message to the audio sharing device in a case of confirming that the first primary audio playing device itself has correctly received the audio packet (and has also received the second acknowledgement message from the first secondary playing device and received the first acknowledgement message from the second primary audio playing device), etc. In addition, whether the audio packet is correct may be determined by means of an error detection and/or correction algorithm, such as Cyclic Redundancy Check (CRC), etc., which will not be described in detail here.

Figure 3A:
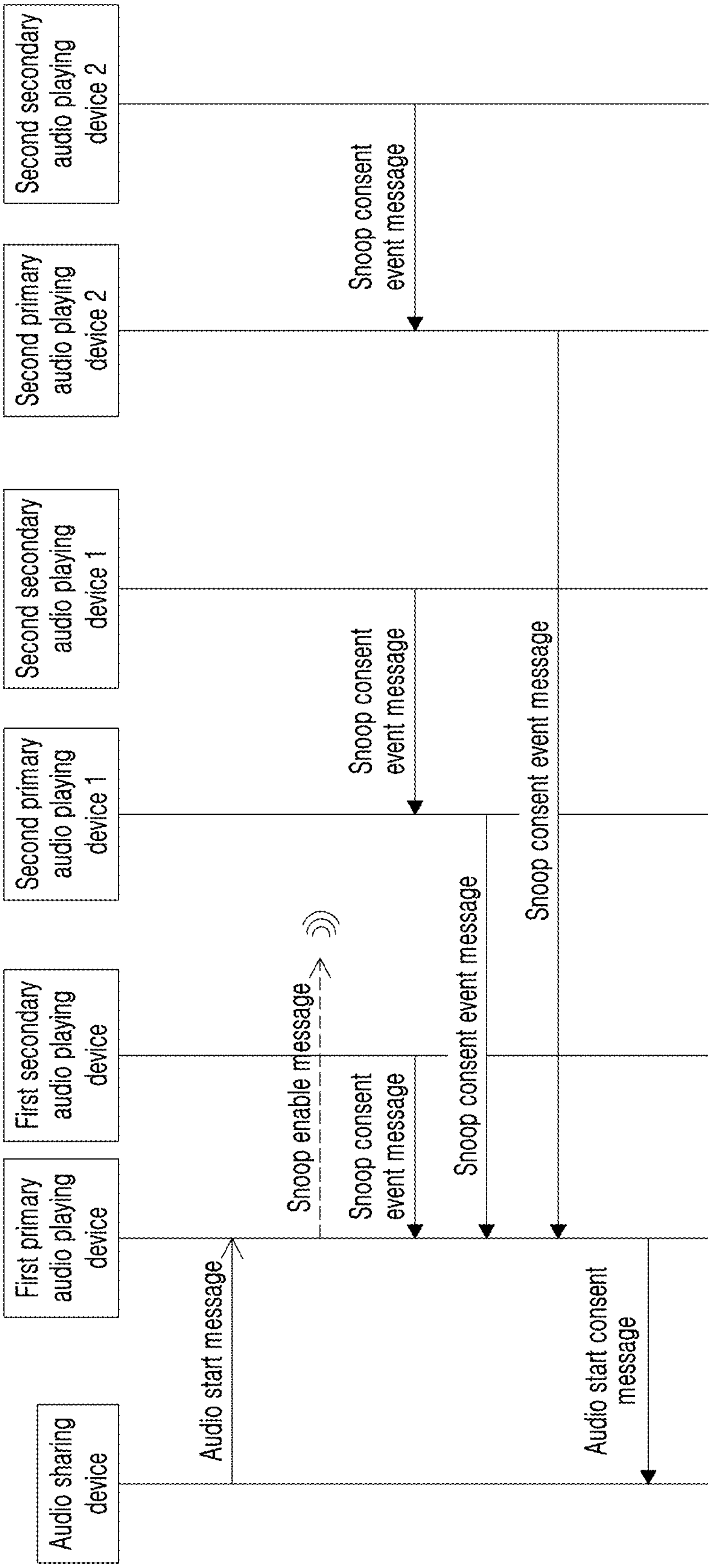
FIGS. 3A and 3B are schematic diagrams illustrating a method for audio sharing according to at least one example embodiment of the inventive concepts.
Figure 3B:
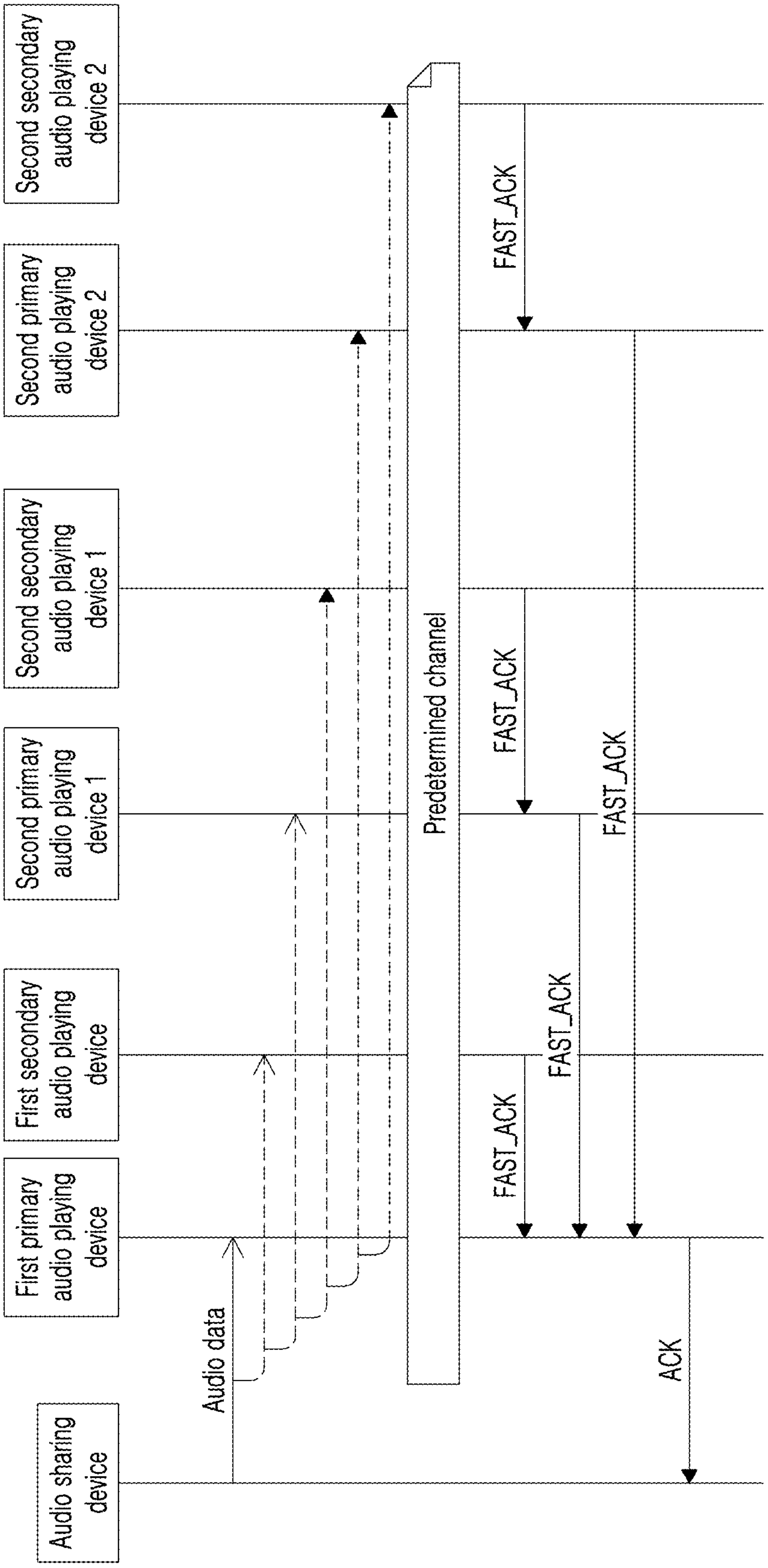

FIGS. 3A and 3B are schematic diagrams illustrating a method for audio sharing according to at least one example embodiment of the inventive concepts. It should be understood that the three pairs of audio playing devices illustrated in FIG. 3A and FIG. 3B are only examples and the example embodiments are not limited thereto, and for example, the number of sets and/or pairs of audio playing devices may be modified as desired.

As shown in FIG. 3A, an audio sharing device as an audio source may establish, for example, a Bluetooth Basic Rate/Enhanced Data Rate (BR/EDR) connection with a first primary audio playing device, and a Bluetooth Low Energy (BLE) connection may be established between the first primary audio playing device and a first secondary audio playing device of a first set of audio playing devices, but the example embodiments are not limited thereto. The first primary audio playing device broadcasts a snoop enable message for a desired and/or predetermined period of time in response to receiving an audio start message sent by the audio sharing device. Subsequently, a second secondary audio playing device that has received the snoop enable message may send a snoop consent event message to a corresponding second primary audio playing device of a second set of audio playing devices and may enter a snoop mode (e.g., listening mode, etc.). Additionally, a first secondary audio playing device that has received the snoop enable message may also send a snoop consent event message to the first primary audio playing device and enter the snoop mode (e.g., listening mode, etc.), and a second primary audio playing device that has received the snoop enable message may send a snoop consent event message to the first primary audio playing device in response to snoop consent event messages sent by the corresponding second secondary playing device, etc. The first primary audio playing device receives the snoop consent event messages for the desired and/or predetermined period of time, stops broadcasting the snoop enable message after the desired and/or predetermined period of time expires, and may subsequently send an audio start consent message to the audio sharing device to send at least one audio packet, etc.

As shown in FIG. 3B, after and/or in response to receiving the audio start consent message, the audio sharing device may send at least one audio packet through the desired and/or predetermined channel. The audio playing devices snoop the desired and/or predetermined channel and receive the audio packet. In a case of receiving the audio packet, a second secondary audio playing device may send an acknowledgement message FAST_ACK to the corresponding second primary audio playing device via, such as, an identification packet (ID Packet), and in addition, the first secondary audio playing device may also send an acknowledgement message FAST_ACK to the first primary audio playing device via, for example, an identification packet (ID Packet), etc., but are not limited thereto. The second primary audio playing device may send an acknowledgement message FAST_ACK to the first primary audio playing device after a random back off time in a case that the second primary audio playing device has received the acknowledgement message FAST_ACK from the second secondary audio playing device and the second primary audio playing device itself has also correctly received the audio packet, but the example embodiments are not limited thereto. The first primary audio playing device may send an acknowledgment message ACK to the audio sharing device in a case that the received acknowledgment messages (e.g., FAST_ACKs) each indicate that the audio packet has been correctly received and the first primary audio playing device itself has correctly received the audio packet, etc.

In addition, the second secondary audio playing device may send a negative acknowledgement (e.g., NACK) message FAST_NACK to its own second primary audio playing device in a case that the audio packet was not received. The second primary audio playing device may send a negative acknowledgement message FAST_NACK to the first primary audio playing device after a random back off time in a case that the second primary audio playing device has received the acknowledgement message FAST_NACK from the second secondary audio playing device and/or the second primary audio playing device itself did not receive the audio packet correctly, but the example embodiments are not limited thereto. The first primary audio playing device sends a negative acknowledgement message NACK to the audio sharing device in a case that the first primary audio playing device has received a negative acknowledgement message (e.g., FAST_NACK) indicating that the audio packet was not received correctly and/or the first primary audio playing device itself did not received the audio packet correctly, etc.

Figure 4:
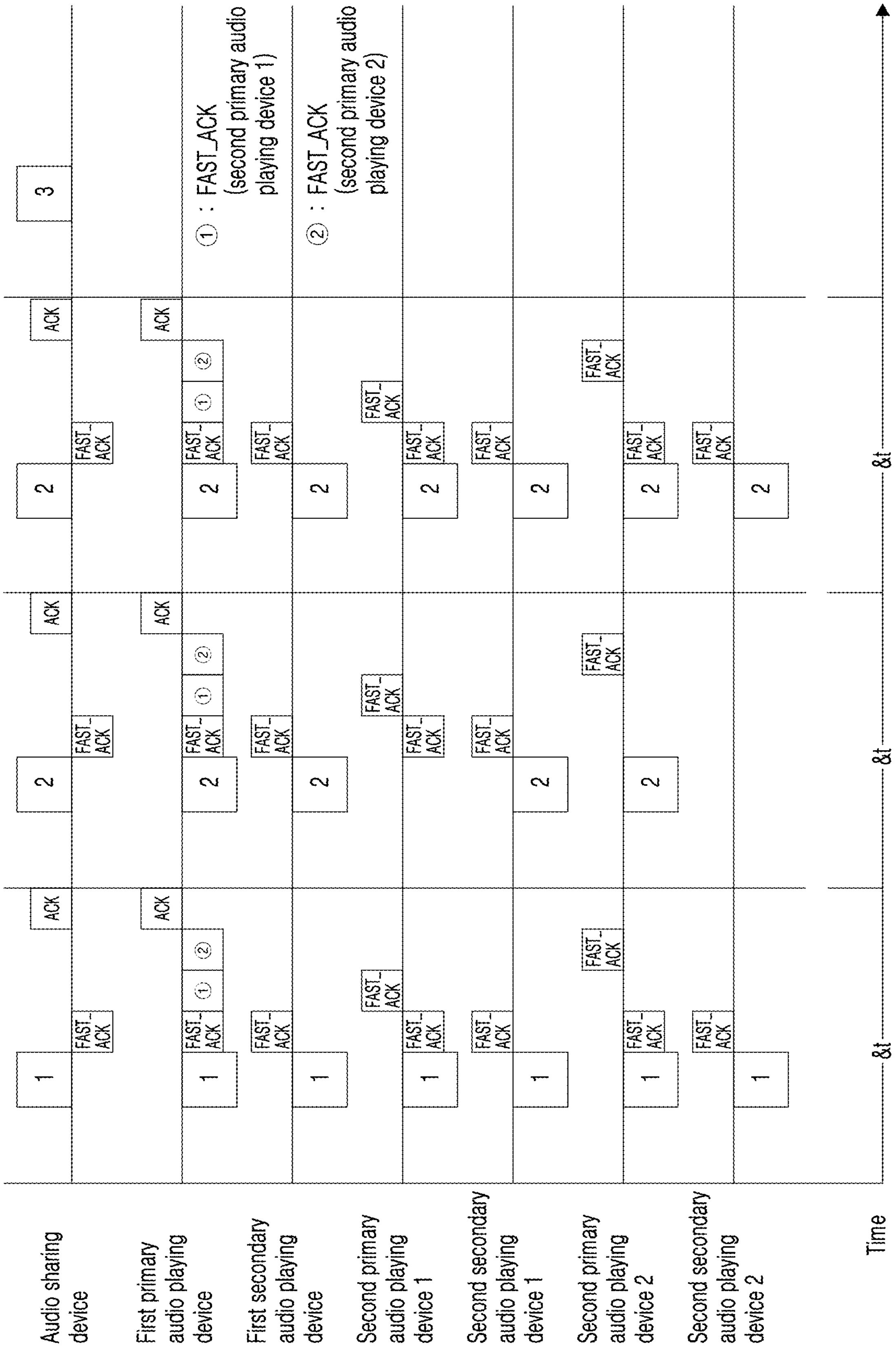
FIG. 4 is a time slot schematic diagram illustrating a method for audio sharing according to at least one example embodiment of the inventive concepts.

FIG. 4 is a time slot schematic diagram illustrating a method for audio sharing according to at least one example embodiment of the inventive concepts. In FIG. 4, numerals 1, 2, and 3 indicate audio packets, FAST_ACK indicates an acknowledgement message sent by a secondary audio playing device to a corresponding primary audio playing device and/or an acknowledgement message sent by a second primary audio playing device to the first primary audio playing device, ACK indicates an acknowledgement message sent by the first primary audio playing device to the audio sharing device, and &t indicates a transmission and/or reception time period, the transmission and reception time period may be a few hundred ms, e.g., 420 ms, etc., for the audio packets, but the example embodiments are not limited thereto. While three pairs of audio playing devices are shown in FIG. 4 as examples, however, the example embodiments of the inventive concepts are not limited thereto. In addition, with respect to the random back off time for the second primary audio playing device sending an acknowledgement message to the first primary audio playing device, if detailed data thereof is desired and/or required for subsequent operations, the random back off time may be determined by the following equation: the random fallback time=audio packet reception time slot−(the number of pairs of audio playing devices−1)×FAST_ACK transmission delay-ACK transmission delay, but the example embodiments are not limited thereto.

As shown in FIG. 4, within &t time period of the audio packet 1, the secondary audio playing device that has correctly received the audio packet 1 sends the FAST_ACK (e.g., an acknowledgement message indicating that the audio packet has been correctly received) to a corresponding primary audio playing device, e.g., the first secondary audio playing device sends the FAST_ACK to the first primary audio playing device, and the second secondary playing device 1 sends the FAST_ACK to the second primary audio playing device 1, etc., and the second secondary playing device 2 sends the FAST_ACK to the second primary audio playing device 2, but the example embodiments are not limited thereto. The second primary audio playing devices that have received the audio packet 1 randomly back off FAST_ACKs with different random back off times to send to the first primary audio playing device after receiving the FAST_ACKs from the second secondary audio playing devices, etc. After receiving the FAST_ACKs of the first secondary audio playing device and the second primary audio playing devices, the first primary audio playing device sends the ACK (e.g., an acknowledgment message indicating that the audio packet has been correctly received) to the audio sharing device.

Within &t time period of the audio packet 2, the second primary audio playing device 1 does not correctly receive the audio packet 2, and thus sends the FAST_NACK (e.g., an acknowledgement message indicating that the audio packet was not correctly received) to the first primary audio playing device. The second secondary audio playing device 2 also does not correctly receive the audio packet 2, and thus sends the FAST_NACK to the second primary audio playing device 2, the second primary audio playing device 2 randomly back off the FAST_NACK to send to the first primary audio playing device, and the first primary audio playing device sends NACK (e.g., an acknowledgement message indicating that the audio packet is not correctly received) to the audio sharing device, etc. After the audio sharing device receives the NACK, it may resend the audio packet 2.

Within &t time period of the audio packet 2, the audio sharing device resends the audio packet 2, and the audio playing devices each receive the audio packet 2. Subsequently, the audio sharing device may send the audio packet 3, etc.

Figure 5:
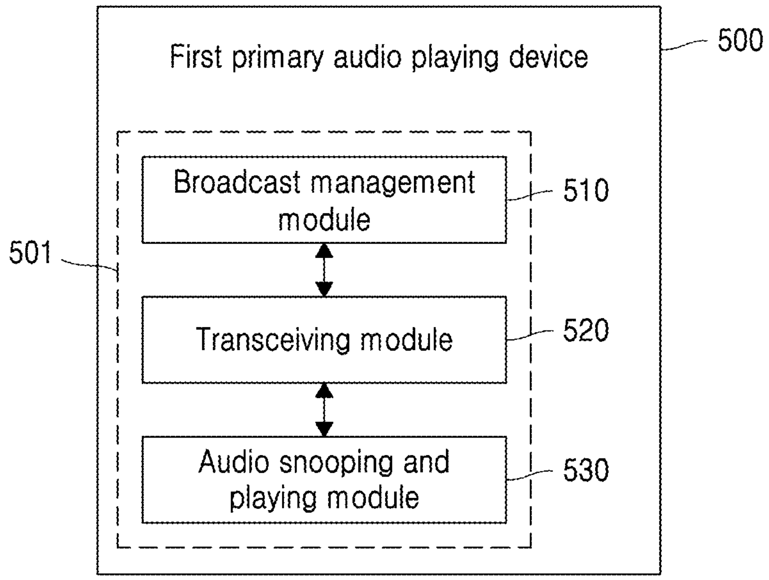
FIG. 5 is a block diagram illustrating a first primary audio playing device according to at least one example embodiment of the inventive concepts.

FIG. 5 is a block diagram illustrating a first primary audio playing device according to at least one example embodiment of the inventive concepts. According to at least one example embodiment, audio may be shared by at least one audio sharing device to at least two sets of audio playing devices, wherein each set of audio playing devices includes a primary audio playing device and a secondary audio playing device, and the primary audio playing device and the secondary audio playing device of each set of audio playing devices may establish a wireless connection, e.g., a short-range wireless connection, etc. Referring to FIG. 5, the first primary audio playing device 500 according to some example embodiments of the inventive concepts may include processing circuitry 501 which may include a broadcast management module 510, a transceiving module 520 (e.g., a transceiver, an antenna, transceiver processing circuitry, etc.), and/or an audio snooping and playing module 530, etc., but the example embodiments are not limited thereto and the first primary audio playing device 500 may include a greater or lesser number of constituent components, such as memory, audio processors, etc. According to some example embodiments, the processing circuitry 501, including the broadcast management module 510, the transceiving module 520, and/or the audio snooping and playing module 530, etc., may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The broadcast management module 510 may be configured to broadcast (e.g., transmit, send, etc.) a snoop enable message including information for a desired and/or predetermined channel. According to at least one example embodiment, the broadcast management module 510 may periodically broadcast a snoop enable message, but is not limited thereto.

The transceiving module 520 may be configured to receive a snoop consent event message sent (e.g., transmitted and/or broadcast, etc.) on the desired and/or predetermined channel by a second primary audio playing device. The transceiving module 520 may further be configured to receive an audio start message including information for the desired and/or predetermined channel sent (e.g., transmitted and/or broadcast, etc.) by the audio sharing device before the broadcast management module 510 broadcasts the snoop enable message, but is not limited thereto.

The audio snooping and playing module 530 may be configured to snoop (e.g., listen for) and play at least one audio packet sent on the desired and/or predetermined channel by the audio sharing device, etc.

In addition, the first primary audio playing device 500, e.g., the processing circuitry 501, may further include an acknowledgement management module configured to receive a first acknowledgement message for indicating that the audio packet has been correctly received sent (e.g., transmitted and/or broadcast, etc.) on the desired and/or predetermined channel by the second primary audio playing device. In this case, the transceiving module 520 may further be configured to send at least one audio packet retransmission indication message to the audio sharing device if the first acknowledgment message sent on the desired and/or predetermined channel by the second primary audio playing device is not received.

Figure 6:
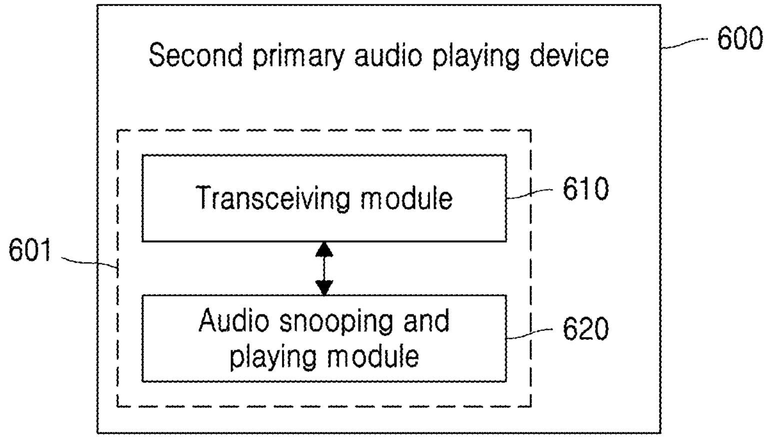
FIG. 6 is a block diagram illustrating a second primary audio playing device according to at least one example embodiment of the inventive concepts.

FIG. 6 is a block diagram illustrating a second primary audio playing device according to at least one example embodiment of the inventive concepts. According to at least one example embodiment, audio may be shared by the audio sharing device to at least two sets of audio playing devices, each set of audio playing devices including a primary audio playing device and a secondary audio playing device, and the primary audio playing device and the secondary audio playing device may establish a wireless connection, e.g., a short-range wireless connection, etc. Referring to FIG. 6, the second primary audio playing device 600 according to at least one example embodiment of the inventive concepts may include processing circuitry 601 which may include a transceiving module 610 and/or an audio snooping and playing module 620, etc., but the example embodiments are not limited thereto and the second primary audio playing device 600 may include a greater or lesser number of constituent components, such as memory, audio processors, a broadcast management module, etc. According to some example embodiments, the processing circuitry 601, including the transceiving module 610, and/or the audio snooping and playing module 620, etc., may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The transceiving module 610 (e.g., transceiver, antenna, transceiver processing circuitry, etc.) may be configured to receive a snoop enable message including information for a desired and/or predetermined channel broadcast and/or transmitted by a first primary audio playing device, etc. The transceiving module 610 may further be configured to receive a second acknowledgement message indicating that the second secondary audio device has correctly received the audio packet sent (e.g., transmitted and/or broadcast, etc.) on the desired and/or predetermined channel by a corresponding second secondary audio device.

The transceiving module 610 may be configured to send (e.g., transmit and/or broadcast, etc.) a snoop consent event message on the desired and/or predetermined channel, etc. The transceiving module 610 may further be configured to send (e.g., transmit and/or broadcast, etc.) a first acknowledgement message indicating that the audio packet has been correctly received to the first primary audio playing device on the desired and/or predetermined channel. According to at least one example embodiment, the transceiving module 610 may send (e.g., transmit and/or broadcast, etc.) a first acknowledgement message to the first primary audio playing device on the desired and/or predetermined channel after a random back off time, but the example embodiments are not limited thereto.

The audio snooping and playing module 620 may be configured to snoop (e.g., listen for) and play at least one audio packet sent on the desired and/or predetermined channel by the audio sharing device, etc.

According to at least one example embodiment of the inventive concepts, there is provided a system for audio sharing including the first primary audio playing device as previously described and/or the second primary audio playing device as previously described, but the example embodiments are not limited thereto.

According to at least one example embodiment of the inventive concepts, there is provided an electronic device including a memory having computer executable instructions stored thereon and processing circuitry, wherein the computer executable instructions, when executed by the processing circuitry, perform at least one of the above methods as previously described, but is not limited thereto.

According to at least one example embodiment of the inventive concepts, there is provided a non-transitory computer-readable storage medium having computer readable instructions stored thereon, which when executed by processing circuitry, causes the processing circuitry to perform at least one of the foregoing methods. Examples of the non-transitory computer-readable storage media here may include: read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray and/or optical disc storage, hard disk drive (HDD), solid state Hard disk (SSD), card storage (such as multimedia card, secure digital (SD) card, extreme digital (XD) card, etc.), magnetic tape, floppy disk, magneto-optical data storage device, optical data storage device, and any other devices configured to store computer programs, computer readable and/or executable instructions, and/or any associated data, data files, and/or data structures, etc., in a non-transitory manner, and provide the computer programs and any associated data, data files, and data structures to the processor or the computer, so that the processor and/or the computer can execute the computer program, etc. The computer program in the above-mentioned non-transitory computer-readable storage medium may run and/or be executed in an environment deployed in computing equipment such as a client, a host, an agent device, a server, etc. In addition, in one example, the computer program and any associated data, data files and data structures are distributed on networked computer systems, so that computer programs and any associated data, data files, and data structures are stored, accessed, and executed in a distributed manner through one or more processors and/or computers, etc.

According to one or more example embodiments of the inventive concepts, the number of connections between the audio sharing device and the audio playing device may be reduced by sending the snoop enable message through broadcasting, thereby reducing power consumption and increasing smoothness; real-time sharing may be achieved by using at least one audio playing device to simultaneously snoop the audio packet sent by the audio sharing device; collision may be avoided and timeliness may be increased at the same time by sending the acknowledgement message to the first primary audio playing device using the desired and/or predetermined channel after a random back off time.

Although various example embodiments of the inventive concepts has been shown and described with reference to particular example embodiments, a person of ordinary skill in the art will understand that various changes in form and detail may be made without departing from a spirit and scope of the example embodiments of the inventive concepts as limited by the claims and equivalents thereof.

What is claimed is:

1. A method for audio sharing, the method comprising:

establishing, by a first primary audio playing device of a first set of audio playing devices, a wireless connection with an audio sharing device;

broadcasting, by the first primary audio playing device, a snoop enable message, the snoop enable message including information indicating a desired wireless communication channel;

receiving, by the first primary audio playing device, a snoop consent event message sent on the desired wireless communication channel from a second primary audio playing device of a second set of audio playing devices, wherein the snoop consent event message indicates a consent of a use of a snoop function to enter a snoop mode; and snooping for, by the first primary audio playing device of the first set of audio playing devices, and playing at least one audio packet sent on the desired wireless communication channel by the audio sharing device.

2. The method for audio sharing of claim 1, further comprising:

receiving, by the first primary audio playing device, an audio start message from the audio sharing device, the audio start message including information regarding the desired wireless communication channel, before the first primary audio playing device broadcasts the snoop enable message.

3. The method for audio sharing of claim 1, wherein the broadcasting the snoop enable message further includes:

periodically broadcasting, by the first primary audio playing device, the snoop enable message.

4. The method for audio sharing of claim 1, further comprising:

receiving, by the first primary audio playing device, a first acknowledgement message from the second primary audio playing device on the desired wireless communication channel, the first acknowledgement message indicating that the audio packet has been correctly received.

5. The method for audio sharing of claim 4, further comprising:

sending, by the first primary audio playing device, an audio packet retransmission indication message to the audio sharing device if the first acknowledgement message is not received.

6. A non-transitory computer readable medium having computer-executable instructions stored thereon, which when executed by processing circuitry, causes the processing circuitry to perform the method of claim 1.

7. A method for audio sharing, the method comprising:

receiving, by a second primary audio playing device of a second set of audio playing devices, a snoop enable message broadcast by a first primary audio playing device of a first set of audio playing devices, the first primary audio playing device having a wireless connection with an audio sharing device, the snoop enable message including information regarding a desired wireless communication channel;

sending, by the second primary audio playing device, a snoop consent event message to the first primary audio playing device on the desired wireless communication channel, wherein the snoop consent event message indicates a consent of a use of a snoop function to enter a snoop mode; and snooping for, by the second primary audio playing device, and playing at least one audio packet sent by the audio sharing device on the desired wireless communication channel.

8. The method for audio sharing of claim 7, further comprising:

receiving, by the second primary audio playing device, a second acknowledgement message from a second secondary audio playing device of the second set of audio playing devices on the desired wireless communication channel, the second acknowledgement message indicating that the audio packet has been correctly received by the second secondary audio playing device; and sending, by the second primary audio playing device, a first acknowledgement message to the first primary audio playing device on the desired wireless communication channel, the first acknowledgement message indicating that the audio packet has been correctly received by the second primary audio playing device.

9. The method for audio sharing of claim 8, wherein the sending the first acknowledgement message to the first primary audio playing device on the desired wireless communication channel further includes:

sending the first acknowledgement message to the first primary audio playing device on the desired wireless communication channel after a random back off time.

10. A first primary audio playing device of a first set of audio playing devices, the first primary audio playing device comprising:

processing circuitry configured to, establish a wireless connection with an audio sharing device;

broadcast a snoop enable message including information regarding a desired wireless communication channel;

receive a snoop consent event message sent on the desired wireless communication channel by a second primary audio playing device of a second set of audio playing devices, wherein the snoop consent event message indicates a consent of a use of a snoop function to enter a snoop mode; and snoop for and play at least one audio packet sent on the desired wireless communication channel by the audio sharing device.

11. The first primary audio playing device of claim 10, wherein the processing circuitry is further configured to:

receive an audio start message from the audio sharing device before broadcasting the snoop enable message, the audio start message including information regarding the desired wireless communication channel.

12. The first primary audio playing device of claim 10, wherein the processing circuitry is further configured to:

periodically broadcast the snoop enable message.

13. The first primary audio playing device of claim 10, wherein the processing circuitry is further configured to:

receive a first acknowledgement message from the second primary audio playing device on the desired wireless communication channel, the first acknowledgement message indicating that the audio packet has been correctly received.

14. The first primary audio playing device of claim 13, wherein the processing circuitry is further configured to:

send an audio packet retransmission indication message to the audio sharing device on the desired wireless communication channel in response to not receiving the first acknowledgement message from the second primary audio playing device.

15. A system for audio sharing comprising the first primary audio playing device of claim 10.

* * * * *